Jan. 18, 1966

T. J. BLOCHER, JR 3,230,389

TRANSISTORIZED CURRENT TRANSFER APPARATUS

Filed May 23, 1962

INVENTOR.
Thomas J. Blocher Jr.

BY W. L. Stout

HIS ATTORNEY

United States Patent Office 3,230,389
Patented Jan. 18, 1966

3,230,389
TRANSISTORIZED CURRENT TRANSFER
APPARATUS
Thomas J. Blocher, Jr., Monroeville, Pa., assignor to Westinghouse Air Brake Company, Wilmerding, Pa., a corporation of Pennsylvania
Filed May 23, 1962, Ser. No. 197,009
3 Claims. (Cl. 307—88.5)

This invention relates generally to condition responsive apparatus and more particularly to a new and improved transistor control circuit for discerning between a legitimate signal and a noise pulse. While the invention is of general utility, it has particular utility when used in connection with a wheel proximity detector and will be described in that environment.

In an effort to achieve a more effective and economical operation of railway systems, an effort is being made to automate as many phases of railroad operations as possible. Thus, for example, various systems are now in use which enable cars to be classified automatically, hot journal bearing conditions on railway vehicles to be determined automatically and the identity of passing railway vehicles to be recognized automatically. In order to satisfactorily achieve any one or all of these automatic operations, it is essential that the exact position of the railway vehicle be determined with respect to a given point. This determination of the position of the vehicle is often achieved through the use of various wheel detecting or locating devices.

For example, in hot journal bearing detecting systems a pair of inductive wheel detectors may be arranged to straddle the axle scanning unit adjacent the rail to provide start and stop functions as the wheel passes each detector for gating that portion of the scanner output which is applicable to a measure of the journal bearing temperature of the passing wheel. However the gating circuit, which is generally in the form of a voltage sensitive device such as a flip-flop, is often actuated by noise pulses which prematurely open or close the gate thereby adversely affecting the operation of the detecting system. Accordingly, it is a principal object of this invention to provide apparatus which will provide a distortion free signal from a wheel locating device.

In an effort to provide a distortion free signal from the various types of inductive wheel locating devices presently employed, various types of filtering devices have been used. However, their acceptance and usefulness has been rather limited since such devices result in delaying the transmission of the filtered signal into the system. Accordingly, it is another object of this invention to provide a circuitry arrangement which will quickly and accurately transfer a distortion free signal into the system which accurately represents the output of the wheel detecting device.

A still further object of the present invention is to provide apparatus which is reliable, economically constructed, and relatively maintenance free.

The embodiment of the invention, shown for illustrative purposes in connection with an inductive wheel detector, utilizes the low power requirements and high speed characteristics of transistors which are arranged to form an output circuit comprising a two-stage amplifier for amplifying and inverting the output of the wheel detector, and a triggering circuit which is actuated by the amplifier for providing a triggering pulse to a time sensitive network which is capable of discriminating between the output of the wheel detector and the relatively short noise pulses.

Other objects, purposes and characteristic features of my invention will become, in part, obvious from the accompanying drawings, and will, in part, be pointed out as the description of my invention progresses with reference being made to the accompanying drawings in which similar reference characters refer to corresponding parts and in which.

Figure 1:
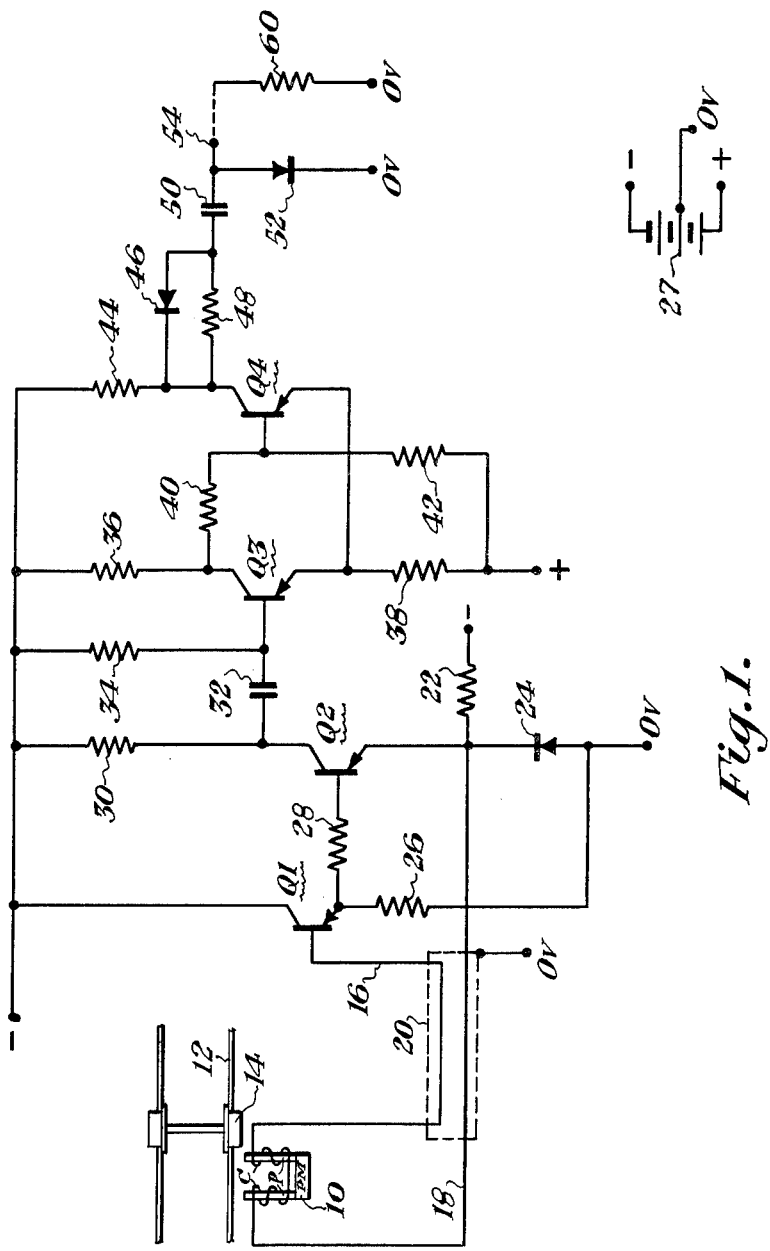
FIG. 1 is a schematic representation of an embodiment of the invention.

Referring now to the drawings, the inductive wheel detecting device 10 with which this invention is shown, for illustrative purposes only, is mounted alongside a rail 12 and includes a permanent magnet PM on which is mounted a pair of soft iron pole pieces P forming a U-shaped structure. A pair of coils C wound in series are disposed on pole pieces P. The free ends of the soft iron pole pieces P are mounted adjacent the track rail 12 such that a passing wheel 14 decreases the reluctance between the ends of the pole pieces, thereby causing an output voltage pulse to be induced in the associated coils C. The resulting output as used in this system is negative as wheel 14 enters the gap between the two poles P and positive as the wheel leaves the gap between the two poles.

The voltage output from wheel inductor 10 is coupled through a pair of leads 16 and 18 to a two-stage amplifier formed by a pair of p-n-p transistors Q1 and Q2. Where there is a considerable distance between wheel inductor 10 and the input to the circuitry of this invention, it is advisable that leads 16 and 18 be protected from unwanted interference by a grounded shielded cable 20.

As shown, lead 16 is connected to the base of transistor Q1 while lead 18 is connected through resistor 22 to a negative source of potential and also through diode 24 to zero or ground potential.

The various biasing voltages to the transistors shown in the drawings are obtained from a suitable source of energy indicated as a battery 27, shown beneath FIG. 1, which has a center tap connected to zero or ground potential.

As previously mentioned coils C in wheel inductor 10 are wired in series on poles P. In order to keep the phase difference of the flux change and the output voltage to a minimum, the first stage of the amplifier formed around transistor Q1 is a high impedance emitter follower. Thus the emitter of transistor Q1 is connected through a load resistor 26 to zero or ground potential and also through coupling resistor 28 to the base of transistor Q2, while the collector is coupled directly to a source of negative potential. The second stage of the amplifier formed about transistor Q2 is a high gain class B amplifier with the collector of transistor Q2 coupled through collector load resistor 30 to the negative source of potential and also through coupling capacitor 32 to the base of transistor Q3. In addition the emitter of transistor Q2 is connected through diode 24 to zero or ground potential and also through resistor 22 to the source of negative potential.

Transistors Q3 and Q4 are of the p-n-p type, and are arranged in the form of a modified Schmidt trigger circuit with transistor Q3 in a normally conducting condition and transistor Q4 normally cut off. The base and collector of transistor Q3 are connected to the negative source of potential through resistors 34 and 36, respectively, while its emitter is coupled to the emitter of transistor Q4 and also to the positive source of potential through resistor 38. The base of transistor Q4 is connected to the collector of transistor Q3 through resistor 40 and to the positive source of potential through resistor 42 while its collector is coupled through collector load resistor 44 to negative potential.

The output of the trigger circuit formed by transistors Q3 and Q4 is taken from the collector of transistor Q4, which is coupled through the parallel combination of diode 46 and resistor 48, to one plate of capacitor 50 the other plate of which is connected through diode 52 to zero or ground potential. The foregoing components, that is, diodes 46, 52, resistor 48 and capacitor 50 in conjunction with resistor 44, make up a time or frequency sensitive network which discriminates, in a manner presently described, between the legitimate output signal of the inductive wheel detector 10 and the relatively short noise pulses which arise from rail vibration and other noise producing sources. The output from this time sensitive network may be taken from terminal 54, which is the junction between capacitor 50 and diode 52, and fed into a gating circuit, such as a flip-flop, represented by resistive load 60.

Figure 2:
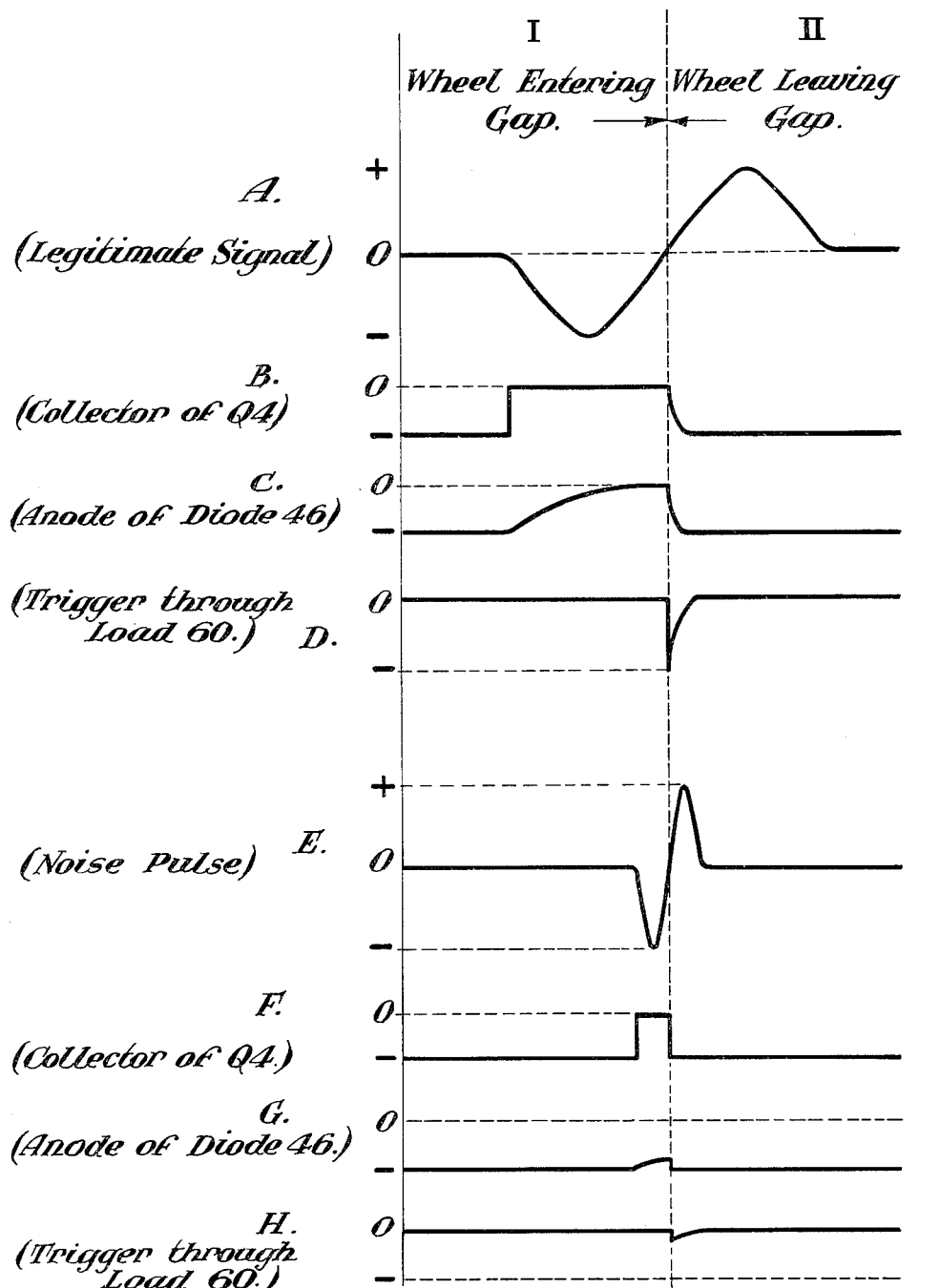
FIG. 2 is a waveform diagram to which reference will be made in describing the invention.

The operation of the embodiment of the invention shown in FIG. 1 is illustrated by the waveforms shown in FIG. 2 where waves A through D represent the output at various points in the circuit caused by a wheel entering and leaving the gap between poles P of wheel detector 10, and waves E through H represent the output a noise pulse causes at similar points throughout the circuit of this invention.

As previously mentioned detector 10 is arranged to provide a negative voltage output as wheel 14 enters the gap between poles P, and a positive voltage output as the wheel leaves the gap. Since the amplitude of the output wave from detector 10 will vary in accordance with the speed of the passing wheel, the size of the wheel flange and the distance of the flange from the edge of the rail, the only accurate indication of the wheel position is the crossover point from the negative output to the positive output. Accordingly, the circuitry of this invention provides an output to the load circuit when the output of the wheel detector reaches this negative to positive crossover point.

Assuming first that there is no wheel present in the immediate vicinity of detector 10, the condition of the circuit is such that transistor Q1 is conducting slightly, transistors Q2 and Q4 are cut off, transistor Q3 is conducting, and capacitor 50 is fully charged.

Now when a wheel 14 approaches detector 10 and enters the gap between poles P, a negative output is produced by detector 10 as shown by the wave on line A in column I of FIG. 2. When the negative voltage output is applied to the base of transistor Q1, the transistor commences conducting heavily and in so doing turns on transistor Q2, with the result that a voltage inversion occurs through transistor Q2 and a positive going waveform appears on its collector which is applied through coupling capacitor 32 to the base of transistor Q3 (thereby cutting off transistor Q3 which in turn causes transistor Q4 to start conducting. With transistor Q4 conducting the negative potential on its collector drops to zero, as shown by the wave on line B, until crossover occurs. At the same time, as shown by the wave on line C, the negative potential on the anode of diode 46 gradually declines to zero as capacitor 50 discharges through transistor Q4, resistor 48 and diode 52 to zero on ground potential. For any signal from detector 10 which represents the presence of a wheel, there will be sufficient time for capacitor 50 to discharge before the crossover from negative to positive output.

When the output from detector 10 reaches crossover point, transistors Q1 and Q2 cut off, transistor Q3 commences conducting and transistor Q4 cuts off thereby removing the discharge path for capacitor 50. As a result, a negative voltage trigger occurs through load 60 and terminal 54 as capacitor 50 charges through diode 46 and resistor 44. This negative voltage trigger pulse as it appears through load 60 and terminal 54 is shown by the waveform in column II on line D. The corresponding increase in the negative potential at the collector of transistor Q4 and at the anode of diode 46 is also shown in column II by the waveforms on lines B and C, respectively.

As stated, one of the objects of this invention is to provide a circuit which is capable of discerning between noise output and legitimate signal outputs without filtering. The noise pulses which are fed through detector 10 arise from various sources, one of which is rail vibration. These noise pulses which are often equal to or greater than the amplitude of the legitimate signal output of the wheel detector are invariably of shorter duration than the legitimate signal. Advantage is taken of this fact by providing a time or frequency sensitive network which is capable of differentiating a short pulse from a long pulse without delaying the output to the load circuit.

As previously mentioned and as shown by the waveforms on line A through D in FIG. 2, capacitor 50 has sufficient time to discharge during the negative portion of the output from the detector. As can be seen this sufficient discharge time arises as a direct result of the width or duration of the negative portion of the detector output which serves to maintain transistor Q4 in a conducting condition. Furthermore since the trigger pulse through load 60 is equal to the amount that capacitor 50 discharges, it is apparent that the load circuit which represents a voltage sensitive device such as a flip-flop, will receive the full charging voltage of capacitor 50.

In the case of a noise pulse, however, there is insufficient time, due to its shorter duration, for capacitor 50 to discharge and thus the charging voltage through the voltage sensitive load circuit 60 is too small to affect its operation. This can be seen by reference to the waveforms on lines E through H. As shown, the noise pulse on line E, and more particularly its negative portion, is substantially shorter in duration than the legitimate signal on line A, with the result that transistor Q4 is turned on for such a short period time, as shown on line F, that capacitor 50 has time to discharge only slightly, as shown on line G. Therefore, the trigger pulse through load 60 for charging capacitor 50, as shown on line H, is correspondingly small and, in view of the types and values of the circuit components presently described, is too small to affect the operation of a voltage sensitive device such as the flip-flop circuit represented by load 60.

As an illustration of a specific embodiment of this invention, the values of components found effective were as follows:

| | |
|---|---|
| Resistors 22, 26, 28 | 1 kilohm. |
| Resistor 30 | 2.4 kilohms. |
| Resistor 34 | 11 kilohms. |
| Resistor 36 | 3.9 kilohms. |
| Resistor 38 | 1.3 kilohms. |
| Resistor 40 | 2.7 kilohms. |
| Resistor 42 | 5.1 kilohms. |
| Resitsor 44 | 2 kilohms. |
| Resistor 48 | 22 kilohms. |
| Capacitor 32 | 35 microfarads. |
| Capacitor 50 | 0.5 microfarad. |
| Diodes 24, 46, 52 | Texas Instrument type 1N2069. |
| Transistors Q1, Q2 | Philco type 2N536. |
| Transistors Q3, Q4 | General Electric type 2N526. |

The foregoing components in circuit arrangement according to FIG. 1 were operated in conjunction with a D.C. voltage supply which supplied a negative 15 volts and a positive 10 volts. In addition, the series coil arrangement in the inductive wheel detector had 1,000 ohms D.C. resistance. With the foregoing voltage and component values, a legitimate signal from the wheel detector caused a negative 10-volt trigger to occur through the load which was sufficient to set or reset the flip-flop, whereas a noise pulse only caused a negative 1 volt trigger through the load which was insufficient to affect the state of the flip-flop.

Although the present invention has provided a circuitry arrangement which is capable of discerning between a legitimate signal and a noise pulse from a railway vehicle wheel detector, it is to be understood that this form is selected to facilitate the disclosure of the invention and is not intended to limit the number of forms which it may assume or the number of applications in which it may be employed. Moreover, it is to be further understood that various modifications, adaptations and alterations may be applied to the specific circuitry shown to meet the requirements of practice, without in any manner departing from the spirit or scope of the present invention.

Having thus described my invention, what I claim is:

1. A circuit for discerning between legitimate signals and noise signals from a source for providing an output to a voltage sensitive load,
   a trigger circuit having a normally conducting first stage and a normally nonconducting second stage,
   amplifier means responsive to the signals from said source for rendering the first stage of said trigger circuit nonconducting and the second stage conducting during a portion of said signals, and
   a frequency sensitive network including a capacitor, a first and a second resistor, and a first and a second diode, said capacitor arranged to discharge through said first resistor and said first diode during the conducting condition of said second stage and to charge through said second resistor and said second diode during the nonconducting condition of said second stage for providing an output through said load.

2. An output circuit for an inductive wheel detector adapted to discern between legitimate signals and noise signals from said detector for providing an output to a load, said output circuit comprising:
   a direct current source;
   first and second input terminals from said detector;
   a first transistor including emitter, base and collector electrodes and having its base electrode connected to the first input terminal;
   a second transistor including an emitter, a base and a collector and having its emitter connected to the second input terminal;
   said first and second transistors each having the base, collector, and emitter suitably biased by said direct current source to form a two-stage amplifier for amplifying and inverting the output of said detector and for providing an output at the collector of said transistor;
   a first capacitor;
   a third transistor including an emitter, a base and a collector and having its base coupled through said first capacitor to the collector of said second transistor;
   a fourth transistor including an emitter, a base and a collector;
   said third and fourth transistors each having the emitter, base, and collector suitably biased by said direct current source to form a trigger circuit with said third transistor in a normally conducting condition and said fourth transistor in a normally nonconducting condition;
   a frequency sensitive network including a first resistor connected between said direct-current source and the collector of said fourth transistor;
   a first semiconductor diode having its cathode connected to said direct current source;
   a parallel combination of a second resistor and a second semiconductor diode having its cathode connected to the collector of the fourth transistor;
   a second capacitor connected between the anodes of said first and second diodes;
   and first and second output terminals connected to said anode and cathode respectively of said first diode.

3. An output circuit for a condition responsive device adapted to distinguish between legitimate signals and noise signals from said device and to produce an output signal in response to a legitimate signal for actuating a load circuit, said output circuit comprising:
   terminals adapted to be connected to a direct current source,
   means for amplifying the output of said condition responsive device,
   trigger means controlled by said amplifying means for assuming a first or second condition, and
   frequency sensitive means for providing an output to said load circuit in accordance with the duration of the second condition of said trigger means,
   said frequency sensitive means including a first resistor connected between one of said terminals and the output of said trigger means,
   a first semiconductor diode having its cathode connected to another of said terminals,
   a parallel combination of a second resistor and a second semiconductor diode having its cathode connected to the output of said trigger means,
   a capacitor connected between the anodes of said first and second diodes;
   and first and second output terminals connected to said anode and cathode respectively of said first diode.

References Cited by the Examiner
UNITED STATES PATENTS

| 2,519,359 | 8/1950 | Dean | 328—111 |
|---|---|---|---|
| 2,589,833 | 3/1952 | Longmire et al. | 328—111 |
| 2,614,154 | 10/1952 | Dionne | 328—111 |
| 2,957,090 | 10/1960 | Hamilton | 307—88.5 |
| 3,005,114 | 10/1961 | Martin et al. | 330—16 |

ARTHUR GAUSS, *Primary Examiner.*